United States Patent
Lavery et al.

(10) Patent No.: US 6,231,653 B1
(45) Date of Patent: May 15, 2001

(54) DYE COMPOSITIONS

(75) Inventors: Aidan Joseph Lavery; Janette Watkinson, both of Manchester (GB)

(73) Assignee: Zeneca Limited (GB)

( * ) Notice: Subject to any disclaimer, the term of this patent is extended or adjusted under 35 U.S.C. 154(b) by 0 days.

(21) Appl. No.: 09/210,935

(22) Filed: Dec. 15, 1998

(30) Foreign Application Priority Data

Dec. 19, 1997 (GB) .................................................. 9726814

(51) Int. Cl.$^7$ .................................................. C09D 11/14
(52) U.S. Cl. ..................................... 106/31.36; 106/31.58
(58) Field of Search ............................... 106/31.36, 31.58

(56) References Cited

U.S. PATENT DOCUMENTS

| | | | |
|---|---|---|---|
| 5,181,045 | 1/1993 | Shields et al. | 347/43 |
| 5,462,592 | 10/1995 | Murakami et al. | 106/31.43 |
| 5,679,143 | 10/1997 | Looman | 106/31.43 |
| 5,743,945 | * 4/1998 | Yamashita et al. | 106/31.58 |
| 5,746,818 | * 5/1998 | Yatake | 106/31.86 |
| 5,773,182 | 6/1998 | Nohr et al. | 430/106 |
| 5,846,306 | * 12/1998 | Kubota et al. | 106/31.75 |
| 5,877,235 | * 3/1999 | Sakuma et al. | 106/31.58 |
| 5,954,866 | * 9/1999 | Ohta et al. | 106/31.89 |

FOREIGN PATENT DOCUMENTS 53-124656   10/1978   (JP) .

* cited by examiner

Primary Examiner—Helene Klemanski
Assistant Examiner—Veronica F. Faison
(74) Attorney, Agent, or Firm—Rothwell, Figg, Ernst & Manbeck

(57) ABSTRACT

An ink composition comprising:
  (a) from 0.1 to 50 parts of a dye;
  (b) from 0.1 to 50 parts of a sugar;
  (c) from 0.1 to 50 parts of a compound selected from phosphoric acid and a carboxylic acid or a salt thereof;
  (d) from 0 to 10 parts of a pH buffer; and
  (e) from 10 to 99 parts of a liquid medium;
wherein all parts are by weight and the total number of parts (a)+(b)+(c)+(d)+(e)=100.

Also claimed is a recording sheet comprising a substrate coated or impregnated with a sugar, a compound selected from phosphoric acid and a carboxylic acid or a salt thereof and optionally a binder; a coating composition; a method of ink jet printing; a substrate printed according to the method; and an ink jet printer cartridge which contains the ink and/or the coating composition.

13 Claims, No Drawings

DYE COMPOSITIONS

COMPOSITIONS

This invention relates to compositions, to inks and to their use in ink jet printing ("IJP"). IJP is a non-impact printing technique in which droplets of ink are ejected through a fine nozzle onto a substrate without bringing the nozzle into contact with the substrate.

There are many demanding performance requirements for dyes and inks used in IJP. For example they desirably provide sharp, non-feathered images having good water-fastness and optical density. The inks are often required to dry quickly when applied to a substrate to prevent smudging, but they should not form a crust over the tip of an ink jet nozzle because this will stop the printer from working. The inks should also be stable to storage over time without decomposing or forming a precipitate which could block the fine nozzle and they should not fade too quickly when printed onto substrates.

Meeting all of these requirements has proved difficult in practice and an improvement to one feature can often lead to a loss in performance of another.

We have now derived a composition which improves the light-fastness of prints prepared by IJP. This can enable inks to be prepared from dyes having hitherto unacceptable light fastness properties. In this way one has much greater flexibility in choosing dyes for ink jet printers. Furthermore, the composition can be used to improve the light fastness of dyes which are already acceptable in the home or office environment so they may be used outdoors where exposure to light is much greater, e.g. on billboards and posters.

According to the present invention there is provided an ink composition comprising:
(a) from 0.1 to 50 parts of a dye;
(b) from 0.1 to 50 parts of a sugar;
(c) from 0.1 to 50 parts of a compound selected from phosphoric acid and a carboxylic acid or a salt thereof;
(d) from 0 to 10 parts of a pH buffer; and
(e) from 10 to 99 parts of a liquid medium;
wherein all parts are by weight and the total number of parts (a) + (b) + (c) + (d) + (e) = 100.

The number of parts of component (a) is preferably from 0.5 to 40, more preferably 1 to 30, especially 2 to 20, more especially 2 to 15.

The number of parts of component (b) is preferably from 0.5 to 40, more preferably 1 to 30, especially 1.5 to 25, more especially 2 to 20.

The number of parts of component (c) is preferably from 0.5 to 40, more preferably 0.2 to 10, especially 0.2 to 5, more especially 0.5 to 5.

The number of parts of component (d) is preferably from 0 to 5, more preferably 0 to 3, especially 0 to 2, more especially 0 to 1.

The number of parts of component (e) is preferably from 50 to 99, more preferably 0 to 99, especially 80 to 95, more especially 85 to 95.

Preferably component (c) is a carboxylic acid, more preferably an aliphatic or aromatic carboxylic acid. The acid may contain a single carboxy group or two or more carboxy groups, more preferably it contains from I to 5 and especially 1 to 4 carboxy groups. Optionally the acid is further substituted by one or more atom or group(s) other than carboxy.

Preferred aliphatic carboxylic acids contain up to 20, more preferably 2 to 15 and especially 2 to 10 carbon atoms. The aliphatic carboxylic acid may be saturated or unsaturated.

Preferred saturated aliphatic acids are alkane derivatives and preferred unsaturated aliphatic acids are alkene and alkyne derivatives. The alkane, alkene and alkyne groups from which the aliphatic acids are derived may be straight chain, branched chain or cyclic and are optionally interrupted by one or more groups or heteroatoms. Preferred interrupting atoms and groups are selected from —O—, —S—, —NR$^1$-, phenyl, piperazine, —C(O)O and —C(O)—; wherein R$^1$ is H, alkyl or phenyl.

When the aliphatic carboxylic acid is further substituted by one or more atom or group other than carboxy, the substituent(s) are preferably selected from —OH, —NH$_2$, —NO$_2$ —SH, —SO$_3$H, —PO$_3$H$_2$, halo (preferably —F or —Cl), Cl—calkyl, C$_{1-4}$-hydroxyalkyl, C$_{,4}$-alkoxy and C$_{1-4}$-hydroxyalkoxy. It is especially preferred that the aliphatic acid is further substituted by one or more group(s) selected from —OH, —SO$_3$H and —PO$_3$H$_2$. More especially the acid is further substituted by one or more —OH group(s).

Preferred saturated aliphatic acids which carry a single carboxy group include for example, acetic acid, phosphonoacetic acid, propionic acid, butyric acid, isobutyric acid, valeric acid, dodecanoic acid and cyclohexanecarboxylic acid.

Preferred saturated aliphatic acids which carry two or more carboxy groups include for example, oxalic acid, malonic acid, succinic acid, glutaric acid, adipic acid, pimelic acid azelaic acid, 1,2,3,4-butanetetracarboxylic acid, ethylenediamine tetraacetic acid, diglycolic acid, iminodiacetic acid 1,1-cyclohexane diacetic acid and nitriliotriacetic acid.

Preferred unsaturated aliphatic acids include for example, maleic acid, fumaric acid and citraconic acid.

Preferred aliphatic acids which carry one or more —OH groups include for example, glycolic acid, lactic acid, tartronic acid, malic add, citric acid, tartaric acid, ascorbic acid and mucic acid.

When the acid is an aromatic carboxylic acid it is preferably a monocyclic or polycyclic aromatic or heteroaromatic group which is substituted by one or more carboxy group or a group which carries a carboxy group.

Preferred monocyclic aromatic groups include optionally substituted benzene, pyridine, pyridone, thiophene and furan groups.

Preferred polycyclic aromatic groups include a polycyclic aromatic group wherein the cyclic rings are fused together or linked by a single covalent bond or a linker group. Preferred linker groups include —O—, —S—, —NR$^a$-, —C(O)—, alkylene and alkenylene groups, wherein R$^a$ is H or C$_{1-4}$-alkyl.

Preferred polycyclic aromatic groups wherein the cyclic rings are fused together include optionally substituted naphthalene, quinoline, indoline and benzofuran.

Preferred polycyclic aromatic groups wherein the cyclic rings are linked by a single covalent bond or a linker group include biphenyl, stillbene and diphenylmethane.

When the aromatic acid is substituted by a group which carries a carboxy group, the substituent is preferably carboxy substituted alkyl, more preferably C$_{1-6}$-carboxyalkyl.

When the aromatic group is further substituted by an atom or group other than carboxy or a group which carries a carboxy group, the preferred substituents are selected from halogen (especially F or Cl); —NO$_2$; —CF$_3$; —CN; —SO$_3$H, —PO$_3$H$_2$; or a C$_{1-6}$-alkyl, C$_{2-6}$-alkenyl, C$_{5-8}$-cycloalkyl or C$_{1-6}$-calkoxy group optionally substituted by —OH, —NH$_2$, —NO$_2$ -SO$_3$H, —PO$_3$H$_2$ or halogen; a group of the formula —SR$^2$, or —COOR$^2$ wherein R$^2$ is H, C$_{1-4}$-alkyl, C$_{5-8}$-cycloalkyl or phenyl; and groups of the formula —OR$^3$, —COR$^3$; —NR$^3$R$^4$, -SO$_2$NR$^3$R$^4$, —SOR$^3_1$ —SO$_2$R$^3$, —NR$^3$COR$^4$, —CONR$^3$R$^4$, or —OCOR$^3$, wherein R$^3$ and R$^4$ each independently is H, C$_{1-4}$-alkyl, C$_{5-8}$-cycloalkyl, phenyl or R$^3$ and R$^4$ together with the nitrogen to which they are attached form a 5 or 6 membered ring, for example piperazine or morpholine.

Especially preferred aromatic carboxylic acids are naphthalene or benzene derivatives which carry one or more carboxy group and optionally one or more group(s) selected from —OH, —SO₃H and —PO₃H₂ (especially one or more —OH group(s)).

Examples of preferred aromatic acids which carry one or more carboxy group include for example, pyromellitic acid, trimesic acid, trimellitic acid, 4-sulphophthalic acid, 3,5-disulphobenzoic acid, phthalic acid, isophthalic acid, terephthalic acid and p- mercaptobenzoic acid.

Examples of preferred aromatic acids which carry one or more carboxy group and one or more -OH group include for example thiosalicylic acid and sulphosalicylic acid.

Especially preferred carboxylic acids are aliphatic carboxylic acids with from 2 to carbon atoms and which are optionally substituted by one or more —OH group. More especially the acid is selected from acsorbic acid, succinic acid and citric acid.

When component (c) is in the form of a salt preferred salts are alkali metal salts, especially lithium, sodium and potassium salts, ammonium and substituted ammonium salts. Especially preferred salts are salts with ammonia and volatile amines. The acids may be converted into a salt using known techniques. For example, an alkali metal salt may be converted into a salt with ammonia or an amine by dissolving an alkali metal salt of the composition in water, acidifying with a mineral acid and adjusting the pH of the solution to pH 9 to 9.5 with ammonia or the amine and removing the alkali metal cations by dialysis.

Component (c) may be a single compound or a mixture of two or more compounds.

The sugar (component (b)) is preferably a monosaccharide, a disaccharide or a polysaccharide and derivatives thereof (preferably sugar alcohols) more preferably the sugar is a reducing sugar. Preferred sugars include for example, glucose, fructose, mannose, galactose, sorbose, maltose, lactose, xylose, arabinose cellobiose and mannotriose. Preferred sugar derivatives include for example, sorbitol, mainnitol, maltitol, α-cyclodextrin, β-cyclodextrin, γ-cyclodextrin, hydroxypropyl-β-cyclodextrin, hydroxyethyl-β-cyclodextrin, hydroxyethyl α-cyclodextrin, carboxymethyl-α-cyclodextrin and carboxymethyl-β-cyclodextrin.

It is especially preferred that the component (b) is selected from glucose, fructose, α-cyclodextrin, β-cyclodextrin, γ-cyclodextrin, inusitol, mannitol, and sorbitol, more especially the sugar is glucose.

Component (b) may comprise a single sugar or a mixture of two or more sugars.

In a first preferred embodiment, component (b) is glucose and component (c) is ascorbic acid.

When the medium is a liquid, preferably components (a) to (d) are completely dissolved in component (e).

Component (a) of the ink is preferably a yellow, magenta, cyan or black dye. It is preferably soluble in water, organic solvents or both. Preferred dyes are of the triphenodioxazine, xanthene, phthalocyanine, indene, methine and azo series, more preferably monoazo, disazo and tisazo dyes, especially monoazo, disazo and trisazo dyes containing a 1-hydroxy-3-sulpho-7-amino naphthalene group.

Examples of suitable dyes include:
yellow dyes, preferably C.I.Direct Yellow 86, 132, 142, 144, C.l.Reactive Yellow 85 and C.I.Reactive Yellow 135;
magenta dyes, preferably C.l.Reactive Red 180, C.I.Acid Red 52, C.l.Direct Violet 106, C.I.Direct Violet 107, C.I.Acid Red 249, a dye of the Formula (4) in International Patent publication No. WO 96/24636, especially compound 101 of the Formula (1):

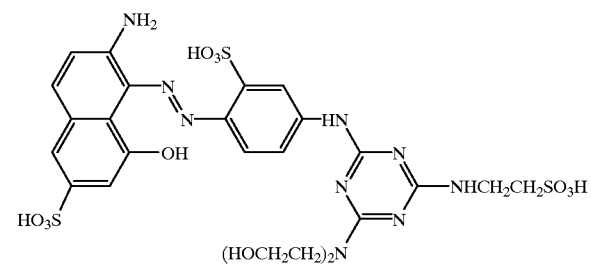

Formula (1)

a dye of the Formula (2), this dye is shown as compound 2 of U.S. Pat. No. 5, 542,970:

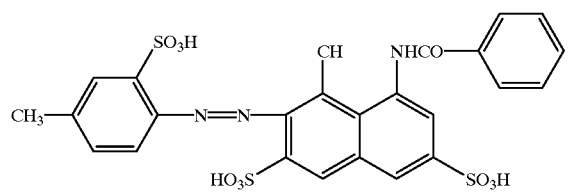

Formula (2)

a dye of the Formula (3); as described in Example 7 of U.S. Pat. No. 5,542,970:

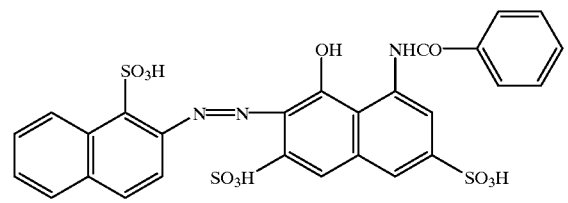

Formula (3)

a dye of Formula (4), as described in Example 1 of GB patent application number 9722396.0 which is incorporated herein by reference thereto:

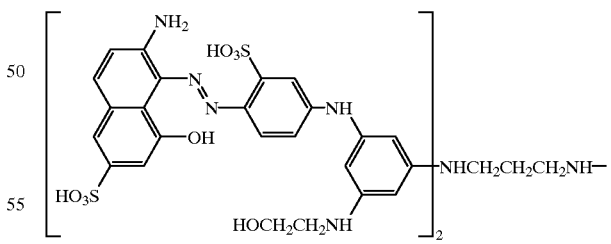

Formula (4)

a mixture of dyes hereinafter referred to as Composition 1 comprising:
(a) from 40 to 60 parts of the dye of Formula (5) in which both groups Z are —NHCH₂CH₂OH;
(b) from 5 to 30 parts of the dye of Formula (5) in which both groups Z are Cl; and
(c) from 15 to 40 parts of the dye of Formula (5) wherein Z is Cl and the other Z is —NHCH₂CH₂OH;
wherein the parts are by weight and the total number of parts (a)+(b)+(c) =100

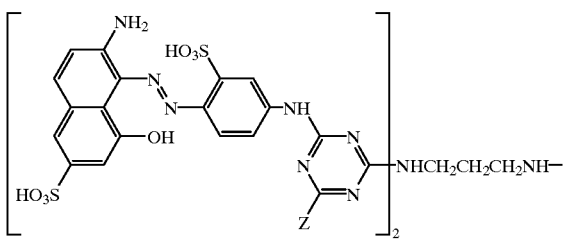

Formula (5)

Cyan dyes, preferably C.I.Acid Blue 9, C.I.Direct Blue 199, C.I.Direct Blue 307, C.I.Reactive Blue 71.

Black dyes, preferably C.I.Direct Black 85, C.I.Direct Black 195 and C.I.Direct Black 168 and dyes of Formula (1) or (11) described in EP Application No. 96113585.2.

Of these dyes the most preferred are the dye of Formula (4), Composition (1), a mixture of composition (1) and C.I.Direct Blue 199, a mixture of C.I.Direct Yellow 86 and C.I.Direct Blue 199 and a mixture of Direct Blue 199 and C.I.Direct Yellow 132.

The dye of Formula (4) may be prepared by (i) diazotising N-acetyl pphenylene diamine sulphonic acid and coupling the resultant diazonium salt with 2-amino-8-naphthol-6-sulphonic acid, preferably under acid conditions;

(ii) removing the acetyl group by hydrolysing the compound resulting from stage (i) under alkaline conditions;

(iii) condensing the product of stage (ii) with cyanuric chloride;

(iv) condensing 1,3-diaminopropane with approximately 2 molar equivalents of the product of stage (iii); and (v) condensing the product of stage (iv) with 2 molar equivalents of ethanolamine preferably of a temperature of 70 to 80° C. for 6 to 8 hours.

Composition (1) may be prepared by mixing the individual components (a), (b) and (c) of the composition. However, preferably the composition is prepared by using the process described above for the preparation of the dye of Formula (4) except that in stage (v) insufficient ethanolamine is used to replace both chlorine atoms in the product of stage (iv). Alternatively, the reaction time and/or temperature used in stage (iv) of the above process may be altered to give a mixture of mono-, di- and unreacted product.

The pH buffer (component (d) of the composition) is preferably a buffer which maintains the pH at 7 to 11, more preferably at pH 8 to 10. Preferred buffers include phosphates, for example $Na_2HPO_4$, $NaH_2PO_4$ and sodium tripolyphosphate and salts of ethylenediamine tetra acetic acid.

Preferred liquid media include water, a mixture of water and an organic solvent and an organic solvent free from water.

When the medium comprises a mixture of water and an organic solvent, the weight ratio of water to organic solvent is preferably from 99:1 to 1:99, more preferably from 99:1 to 50:50 and especially from 95:5 to 80:20.

It is preferred that the organic solvent present in the mixture of water and organic solvent is a water-miscible organic solvent or a mixture of such solvents. Preferred water-miscible organic solvents include $C_{1}$-alkanols, preferably methanol, ethanol, n-propanol, isopropanol, n-butanol, sec-butanol, tert-butanol, n-pentanol, cyclopentanol and cyclohexanol; linear amides, preferably dimethylformamide or dimethylacetamide; ketones and ketone-alcohols, preferably acetone, methyl ether ketone, cyclohexanone and diacetone alcohol; water-miscible ethers, preferably tetrahydrofuran and dioxane; diols, preferably diols having from 2 to 12 carbon atoms, for example pentane-1,5-diol, ethylene glycol, propylene glycol, butylene glycol, pentylene glycol, hexylene glycol and thiodiglycol and oligo- and poly-alkyleneglycols, preferably diethylene glycol, triethylene glycol, polyethylene glycol and polypropylene glycol; triols, preferably glycerol and 1,2,6-hexanetriol; mono-$C_{1-4}$-alkyl ethers of diols, preferably mono-$C_{1-4}$-alkyl ethers of diols having 2 to 12 carbon atoms, especially 2-methoxyethanol, 2-(2-methoxyethoxy)ethanol, 2-(2-ethoxyethoxy)-ethanol, 2-[2-(2-methoxyethoxy)ethoxy]ethanol, 2-[2-(2-ethoxyethoxy)-ethoxy]-ethanol and ethyleneglycol monoallylether; cyclic amides, preferably 2-pyrrolidone, N-methyl-2-pyrrolidone, N-ethyl-2-pyrrolidone, caprolactam and 1,3-dimethylimidazolidone; cyclic esters, preferably caprolactone; sulphoxides, preferably dimethyl sulphoxide and sulpholane. Preferably the liquid medium comprises water and 2 or more, especially from 2 to 8, water-soluble organic solvents.

Especially preferred water-soluble organic solvents are cyclic amides, especially 2-pyrrolidone, N-methyl-pyrrolidone and N-ethyl-pyrrolidone; diols, especially 1,5-pentane diol, ethyleneglycol, thiodiglycol, diethyleneglycol and triethyleneglycol; and mono- $C_{1-4}$-alkyl and $C_{1-4}$alkyl ethers of diols, more preferably mono- $C_{1-4}$-alkyl ethers of diols having 2 to 12 carbon atoms, especially 2-methoxy-2-ethoxy-2-ethoxyethanol.

Examples of further suitable ink media comprising a mixture of water and one or more organic solvents are described in U.S. Pat. No. 4,963,189, U.S. Pat. No. 4,703,113, U.S. Pat. No. 4,626,284 and EP 4,251 ,50A.

When the liquid medium comprises an organic solvent free from water, (i.e. less than 1% water by weight) the solvent preferably has a boiling point of from 30° to 200° C., more, preferably of from 400 to 150° C., especially from 50 to 125° C. The organic solvent may be water-immiscible, water-miscible or a mixture of such solvents. Preferred water-miscible organic solvents are any of the hereinbefore described water-miscible organic solvents and mixtures thereof. Preferred water-immiscible solvents include, for example, aliphatic hydrocarbons; esters, preferably ethyl acetate; chlorinated hydrocarbons, preferably $CH_2Cl_2$; and ethers, preferably diethyl ether; and mixtures thereof.

When the liquid medium comprises a water-immiscible organic solvent, preferably a polar solvent is included because this enhances solubility of the dye in the liquid medium. Examples of polar solvents include $C_{1-4}$-alcohols. In view of the foregoing preferences it is especially preferred that where the liquid medium is an organic solvent free from water it comprises a ketone (especially methyl ethyl ketone) &/or an alcohol (especially a $C_{1-4}$-alkanol, more especially ethanol or propanol).

The organic solvent free from water may be a single organic solvent or a mixture of two or more organic solvents. It is preferred that when the medium is an organic solvent free from water it is a mixture of 2 to 5 different organic solvents. This allows a medium to be selected which gives good control over the drying characteristics and storage stability of the ink.

Ink media comprising an organic solvent free from water are particularly useful where fast drying times are required and particularly when printing onto hydrophobic and non-absorbent substrates, for example plastics, metal and glass.

Preferred low melting solid media have a melting point in the range from 60° C. to 125° C. Suitable low melting point solids include long chain fatty acids or alcohols, preferably those with $C_{18-24}$ chains, and sulphonamides. The dye of Formula (1) may be dissolved in the low melting point solid or may be finely dispersed in it.

The ink may also contain additional components conventionally used in ink jet printing inks, for example viscosity and surface tension modifiers, corrosion inhibitors, biocides, kogation reducing additives and surfactants which may be ionic or non-ionic.

According to a second feature of the present invention there is provided a recording sheet comprising a substrate coated or impregnated on at least one surface thereof with a composition comprising:
(i) a sugar;
(ii) a compound selected from a carboxylic acid and phosphoric acid in free acid or salt form; and
(iii) optionally a binder.

Preferred sugars and compounds in components (i) and (ii) are the preferred sugars and acids as hereinbefore defined in relation to the first aspect of the present invention.

Accordingly, in a preferred embodiment, component (i) is glucose and component (ii) is selected from succinic acid, citric acid and ascorbic acid in free acid or salt form.

The substrate is preferably a paper, overhead projector slide or textile material. Preferred papers are plain or treated papers which may have an acid, alkaline or neutral character. Examples of commercially available treated papers include HP Premium Coated Paper (available from Hewlett Packard Inc), HP Photopaper (available from Hewlett Packard Inc), Stylus Pro 720 dpi Coated Paper, Epson Photo Quality Glossy Film (available from Seiko Epson Corp.), Epson Photo Quality Glossy Paper (available from Seiko Epson Corp.), Canon HR 101 High Resolution Paper (available from Canon), Canon GP 201 Glossy Paper (available from Canon), and Canon HG 101 High Gloss Film (available from Canon).

When present, the binder is preferably a polymeric binder, more preferably a water-soluble or water-dissipatable polymeric binder.

Preferred water-soluble polymeric binders include starches, preferably hydroxy alkyl starches, for example hydroxyethylstarch; celluloses, for example celluslose, methylcellulose, hydroxyethyicellulose, hydroxypropylcellulose, hydroxyethyl methyl cellulose and carboxymethlycellulose (and salts thereof) and cellulose acetate butyrate; gelatin; gums, for example guar, xanthan gum and gum arabic; polyvinylalcohol; polyvinylphosphate; polyvinylpyrrolidone; polyvinylpyrrolidine, polyethylene glycol, hydrolysed polyvinylacetate; polyethylene imine; polyacrylamides; polyvinylpyridine; acid-functional acrylic polymers and copolymers, for example poly(meth)acrylic acid and copolymers of (meth)acrylic acid and other (meth)acrylate monomers; amine-functional acrylic polymers and copolymers, for example polydimethylaminoethylmethacrylate; acid or amine functional urethane polymers, preferably those containing dimethylolpropanoic acid and/or pendant or terminal polyethylene glycols; polyesters, preferably those which carry water-solubilising groups, for example polyesters obtainable by polymerising a polyol with sodiosulphoisophthalic acid.

Preferred water-dissipatable polymeric binders are water-dissipatable polymers, more preferably latex polymers, for example cationic, non-ionic and anionic styrene-butadiene latex's; and dispersions of poly(acrylate), poly(methacrylate), polyester, polyurethane or vinyl polymers and copolymers thereof. The polymer dispersions are preferably prepared by emulsion, suspension, bulk or solution polymerisation followed by dispersion into water.

We found that the light-fastness of a print is improved if an ink is printed onto a recording sheet according to the second aspect of the invention. By coating or impregnating the substrate one does not need to re-formulate existing stocks of inks.

Instead the light fastness is improved by applying the existing ink to a recording sheet according to the second aspect of the invention It is preferred that the composition on the substrate is applied thereto as a liquid.

According to a third aspect of the present invention there is provided a coating composition comprising a composition as hereinbefore defined in relation to the second aspect of the present invention and a liquid medium- The liquid medium is preferably as hereinbefore defined in relation to the first aspect of the present invention. Preferably the composition is dissolved/dispersed in the liquid medium.

The coating composition preferably comprises:
(i) from 50 to 99 parts of one or more of:
an organic solvent;
water;
a mixture of water and a water-miscible organic solvent;
the binder; and
a mixture of the binder and water;
(ii) from 1 to 50 parts of the sugar; and
(iii) from 0.5 to 20, more preferably 0.2 to 10, parts of the compound selected from phosphoric acid and a carboxylic acid in free acid or salt form; wherein the parts are by weight and the total number of parts (i)+(ii)+(iii)=100.

Component (i) of the coating composition is preferably selected from one or more or an organic solvent; a mixture of water and a water-miscible organic solvent; the binder; and
a mixture of the binder and water.

Preferred organic solvents, sugars and component (iii) in the coating composition according to the third aspect of the present invention are those described above in relation to the inks according to the first aspect of the invention.

The binders which may be present in the coating composition are those described in relation to the second aspect of the invention.

In a preferred embodiment component (iii) is selected from citric acid, succinic acid and ascorbic acid.

The coating composition according to the third aspect of the invention and the composition described in relation to the second aspect of the present invention may be applied to the substrate using any suitable method, for example by dipping, K-bar coating, roller coating or printing, especially ink jet printing. It is especially preferred that the composition is applied to the substrate by means of an ink jet printer.

When the coating composition is applied to the substrate by means of an ink jet printer, it is preferred that the coating composition has a viscosity at 25° C. of less than 20, more preferably less than 10cP.

A fifth aspect of the invention provides an ink jet printing process comprising applying a coating composition according to the third aspect of the present invention to a substrate by means of an ink jet printer.

The preferred substrates for use in the process according to the fifth aspect of the invention are as defined in relation to the second aspect of the present invention. It is especially preferred that the substrate is paper.

A sixth aspect of the invention provides a process for printing an image on a substrate comprising applying thereto an ink, characterised in that the ink is as hereinbefore defined in the first aspect of the present invention.

In a preferred embodiment of the sixth aspect of the invention, the ink according to the first aspect of the invention is applied to the substrate together with one or more different inks comprising a colorant and a liquid medium. For example, a blue image may be obtained by over printing a cyan ink comprising a cyan dye, a carboxylic acid, a sugar and a liquid medium with a magenta ink comprising a magenta dye and a liquid medium. We have found that the resulting blue prints still exhibit a very high light-fastness compared to prints obtained without using the acid and sugar.

Preferred substrates in the sixth aspect of the invention are paper, plastic films, over head projector slides and textile materials as hereinbefore defined in relation to the second aspect of the present invention.

According to a seventh aspect of the present invention there is provided a process for printing an image on a substrate comprising applying thereto an ink comprising a colorant and a liquid medium by means of an ink jet printer, characterised in that the substrate is a recording sheet as hereinbefore defined in the second aspect of the invention.

In a preferred embodiment of the process according to the seventh aspect of the invention, the ink is an ink according to the first aspect of the invention. In another preferred embodiment, the ink is applied to the substrate together with an ink according to the first aspect of the present invention.

According to an eighth aspect of the present invention there is provided an ink jet printing process comprising applying to a substrate by means of an ink jet printer:

(a) a coating composition according to the third aspect of the invention; and (b) an ink comprising a colorant and a liquid medium;

wherein the coating composition is applied to the substrate during, after or prior to applying the ink to the substrate.

The ink jet printer preferably applies the ink to the substrate in the form of droplets which are ejected through a small orifice onto the substrate. Preferred ink jet printers are piezoelectric ink jet printers and thermal ink jet printers. In thermal ink jet printers, programmed pulses of heat are applied to the ink in a reservoir by means of a resistor adjacent to a small orifice, thereby causing the ink to be ejected from the orifice in the form of small droplets directed towards the substrate during relative movement between the substrate and the orifice. In piezoelectric ink jet printers the oscillation of a small crystal causes ejection of the ink from the orifice.

In a preferred embodiment of the process according to the eighth aspect of the present invention, the ink in step (b) is an ink according to the first aspect of the present invention.

Preferably in the process according to the eighth aspect of the invention the coating composition is applied to the substrate prior to the application of the ink. It is especially preferred that the same ink jet printer is used to apply the coating composition and the ink to the substrate. When the same ink jet printer is used to apply the ink and the coating composition, it preferably has a nozzle or a series of nozzles in the printer which are dedicated to the application of the coating composition. A suitable ink jet printer and a method for its control is described in EP 657 849.

According to a ninth aspect of the present invention provided a paper, an overhead projector slide or a textile material printed with an ink according to the first aspect of the present invention or by means of the process according to the sixth aspect of the present invention.

According to a tenth aspect of the present invention there is provided an ink jet printer cartridge containing a liquid, characterised in that the liquid is an ink according to the first aspect of the present invention, or a coating composition according to the third aspect of the present invention.

The invention is further illustrated by the following Examples in which all parts and percentages are by weight unless otherwise stated.

EXAMPLE 1

Dye 1

C.I.Direct Blue 199, available from Zeneca Limited.

Dye 2

A mixture of Dyes (A), (B) and (C).

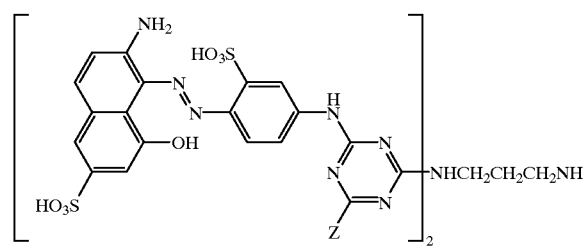

In Dye (A) both groups represented by Z are —NH$_2$CH$_2$CH$_2$OH

In Dye (B) one group represented by Z is Cl and the other is —NH$_2$CH$_2$CH$_2$OH.

In Dye (C) both groups represented by Z are Cl.

The relative proportions, by weight of Dye (A): Dye (B): Dye (C) was 47:41:12. Dye (2) was prepared as follows:

Stage (1): Diazotisation and Couplinq

To N-acetyl pphenylenediamine sulphonic acid (0.5moles) in water (400mi) was added concentrated hydrochloric acid (250mi) and the solution was cooled to 0–5° C. 2N sodium nitrite (250ml) was added dropwise over 5 minutes with stirring. After 15 minutes, excess nitrous acid was destroyed by the addition of sulphamic acid (0.2g). To the resulting suspension was added a solution of 2-amino-8-naphthol-6-sulphonic acid (0.5 moles n 600ml of water at pH6) and the pH was adjusted to 4 by the addition of sodium acetate. The mixture was stirred at 0–5° C. for 4 hours before being allowed to warm to room temperature.

Stage (ii) Hydrolysis

The acetyl group present on the product of stage (i) was removed by alkaline hydrolysis by adding concentrated sodium hydroxide (200mi) to the mixture resulting from stage 1 and heating at 70–80° C. for 1.5 hours.

After cooling to room temperature, the pH was adjusted to 7 by the addition of concentrated hydrochloric acid. Sodium chloride (20% weight/volume) was added and the precipitated solid was collected by suction filtration, washed with 30% brine and dried at 70° C. Yield 132g (strength 45%).

Stage (iii) Condensation with Cyanuric Chloride

The product from Stage (ii) (0.15 moles) was dissolved in water (500mI) at pH7. Cyanuric chloride (0.17 moles) was dissolved in acetone (300ml) and added dropwise to the stirred solution at 0–5° C. The mixture was then stirred for 40 minutes.

Stage (iv) Condensations 1,3-diaminopropane (0.08 moles) was added. The temperature was raised to 30–40° C. and the pH maintained at 8.5–9 for a period of 16 hours. Ethanolamine (0.45 moles) was added and the temperature of the mixture was elevated to 70–80° C. The pH was maintained at 9–10 for a period of 2.5 hours. Methylated spirits was added to precipitate the product which was collected by suction filtration and washed with further methylated spirits. The crude dye was redissolved in distilled water and dialysed using visking tubing to a permeate conductivity of below 100µS. The solution was evaporated to dryness giving a yield of 185g of the title product.

Ink (1)

Dye (1) (0.60g) was dissolved in water (13.8g) together with butyl carbitol (2.0g) glycerol (2.0g) Surfynol 465 (0.20g) D-glucose (1.0g) and ascorbic acid (0.40g) by sonicating in a sonic bath. The pH was adjusted to pH8 with sodium hydroxide using a pH meter. The ink was filtered through a 0.45lim filter and put into one chamber of a SEC trichamber inkjet cartridge.

Ink (2)

Dye (2) (0.6g) was dissolved in water (15.19) together with butyl carbitol (2.0g), glycerol (2.0g), Surfynol 465 (0.20g) and ascorbic acid (0.10g) by sonicating in a sonic bath. The pH was adjusted to pH8 with acetic acid using a pH meter. The ink was filtered through a 0.45 µm filter and put into a second chamber of the SEC trichamber cartridge used above.

Paper Coating Composition: Coating (1)

Coating (1) was prepared by dissolving D-glucose (10g) and ascorbic acid (2g) in distilled water (88g) with stirring.

Surface Coating

Coating (1) was pipetted into a pelikan inkjet cartridge. The cartridge was put into a HP560 printer and a large box printed onto the following papers:

Xerox Acid 4024

SEC Glossy Paper

SEC Glossy Film

Light Fastness Measurements

Ink (1) and Ink (2) were printed onto the substrates shown in Table 1 using a SEC Stylus Pro Printer to give a blue print (i.e. the cyan ink (Ink 1) and the magenta ink (Ink 2) were printed onto the same area of the substrate to give a blue colour.

After drying the blue print was mounted half covered in an Atlas Ci35a weatherometer and faded for 50 hours. The print was removed and the ΔE (colour difference) between the faded and unfaded portion measured using an X-rite 938 spectrodensitometer.

The ΔE value was calculated using the formula:

$$\Delta E = (\Delta L^2 + \Delta a^2 + \Delta b^2)^{0.5}$$

wherein ΔL, Δa and Δb refer to the colour space co-ordinates (L, a, b) of the prints as measured using the spectrodensitometer before and after fading. Thus $\Delta L^2$ refers to $$(L_{before\ fading} - L_{afterfading})^2$$

Thus, the smaller the ΔE value, the higher the light fastness of the print. In table 1 the following abbreviations are used:

XA: Xerox Acid 4024 Paper

SGP: SEC Glossy Paper

SGG: SEC Glossy Film

XA+C: Xerox Acid 4024 Pre-coated with coating (1)

SGP+C: SEC Glossy Paper Pre-coated with coating (1)

SGF+C: SEC Glossy Film Pre-coated with coating (1)

TABLE 1

| Substrate | Light-fastness (ΔE) |
| --- | --- |
| XA | 7.95 |
| SGP | 11.89 |
| SGF | 12.09 |
| XA + C | 4.25 |
| SGP + C | 8.65 |
| SGF + C | 3.87 |

Comparative Example 1

Comparative Ink A

Ink A was prepared as for Ink 1 but without using Ascorbic acid and glucose.

Comparative Ink B

Ink B was prepared as for Ink 2 but without ascorbic acid.

Ink A and Ink B were printed onto the papers shown in Table 2 as described in Example 1 to give a blue print. The light-fastness was then measured as in Example 1. The same abbreviations are used in Table 2.

TABLE 2

| Substrate | Light-fastness (ΔE) |
| --- | --- |
| XA | 8.45 |
| SGF | 13.24 |

A composition between Table 1 and Table 2 clearly shows that Prints resulting from the inks according to the first aspect of the invention exhibit a greatly improved light fastness over those obtained using an ink which is free from glucose and ascorbic acid.

Similarly, application of a composition according to the second aspect of the present invention to a paper in combination with printing the pr-coated paper with an ink according to the first aspect results in a dramatic increase in light fastness.

For example compare row XA+C in Table 1 with row XA in Table 2; ΔE=4.25 as opposed to 8.45.

EXAMPLE 2 ink (3) (Cyan)

Dye (1) (0.30g) was dissolved in water (7.509) together with 2-pyrrolidone (0.5g) thiodiglycol (0.5g), Surfynol 465 (0.20g), sulphosalicylic acid (0.5g) and cellobiose (0.5g) by sonicating in a sonic bath. The pH was adjusted to pH9.5 with ammonia using a pH meter The ink was then filtered through a 0.45 µm filter.

Ink (4) (magenta)

Dye (2) (0.30g) was dissolved in water (8.00g) together with 2-pyrrolidone (0.5g) thiodiglycol (0.5g) Surfynol 465 (0.20g) and cellobiose (0.5g) by sonicating in a sonic bath. The pH was adjusted to pH9.5 with ammonia using a pH meter. The ink was filtered through a 0.45pm filter.

Control Inks

Comparative Inks (C) and (D) were prepared as for Inks (3) and (4) but without the sulphosalicylic acid and cellobiose, the balance of the ink formulation being made up with water.

Ink iet Printing

Inks (3) and (4) and Comparative Inks (C) and (D) were put into Canon trichamber inkjet cartridges and loaded into a Canon 4300 ink jet printer. Blue prints were then prepared on the substrates shown in Table 3 using Inks (3) and (4) together, and Comparative Inks (C) and (D) together as described in Example 1.

Sections of each print was mounted, half covered in an Atlas Ci35a Weatherometer and faded for 50 hours. The print was removed and the ΔE (colour difference) between the faded and unfaded portion measured using an X-Rite 938 spectrodensitometer as described in Example 1.

TABLE 3

| Ink | Xerox Acid | SEC glossy Film | SEC Glossy Paper |
|---|---|---|---|
| Control (C) + (D) | 9.3 | 25.4 | 27.1 |
| Inks (3) + (4) | 7.9 | 14.6 | 17.6 |

EXAMPLE 3

Ink (5)

Dye 1 (0.30g) was dissolved in water (7.809) together with 2-Pyrrolidone (0.5g) thiodiglycol (0.5g), Surfynol 465 (0.20g), phosphonoacetic acid (0.2g) and cyclodextrin (0.5g) by sonicating in a sonic bath. The pH was adjusted to pH9.5 with ammonia using a pH meter. The ink was filtered through a 0.451 μm filter and put into one chamber of a Canon trichamber inkjet cartridge.

Ink (6)

Dye (2)(0.30g) was dissolved in water (8.009) together with 2-pyrrolidone (0.5g) thiodiglycol (0.5g) Surfynol 465 (0.20g) and cyclodextrin (0.5g) by sonicating in a sonic bath. The pH was adjusted to pH9.5 with ammonia using a pH meter. The ink was filtered through a 0.45mm filter and put into one chamber of a Canon trichamber inkjet cartridge.

Ink Jet Printing

Inks (5) and (6) were printed onto the substrates shown in Table 4 to give a blue 35 print as described in Example 2 The light-fastness of the print was measured and compared with that of a blue print obtained using Control Inks (C) and (D), as described in Example 2.

TABLE 4

| Ink | Xerox Acid | SEC glossy Film | SEC Glossy Paper |
|---|---|---|---|
| Control (C) + (D) | 9.3 | 25.4 | 27.1 |
| Inks (5) + (6) | 7.6 | 15.2 | 16.8 |

EXAMPLE 4

Inks

The inks described in Tables 5 and 6 may be prepared according to the formulations shown. Numbers quoted in the second column onwards refer to the number of parts of the relevant ingredient and all parts are by weight. The inks may be applied to paper by thermal or piezo ink jet printing.

The following abbreviations are used in Tables 5 and 6:

| | |
|---|---|
| PG = propylene glycol | DEG = diethylene glycol |
| NMP = N-methyl pyrrolidone | CAR = butylcabitol |
| GLY = glycerol | 2P = 2-pyrrolidone |
| P12 = propane-1,2-diol | PHO = $Na_2HPO_4$ and |
| TDG = thiodiglycol | PEG = Polyethylene glycol |
| 5P = pentane-1,5-diol | EG = ethylene glycol |
| $H_2O$ = water | TEA = triethanolamine |
| ASC = ascorbic acid | GL = glucose |
| SU = sucrose | FR = fructose |
| CA = citric acid | SA = succinic acid |
| SS = sulphosalicylic acid | PAA = phosphonoacetic acid |
| PA = phthalic acid | TA = terephthalic acid |
| MA = malonic acid | AA = acetic acid |
| VA = valeric acid | |

In Tables 5 and 6 under the column marked "dye"

Dye 1 is Dye 1 used in Example 1; Dye 2 is Dye 2 used in Example 2;

Dye 3 is the dye of Formula (2); Dye 4 is the dye of Formula (1);

Dye 5 is the dye of Formula (3); Dye 6 is the dye of Formula (4);

Dye 7 is a mixture of 85 parts Dye 2 and 15 parts C.I.Direct Blue 199; and

Dye 8 is a mixture of 80 parts C.I.Direct Blue 199 and 20 parts C.I.Direct Yellow 132.

TABLE 5

| Dye | Dye content | Sugar | Sugar content | Acid | Acid Content | $H_2O$ | PEG | SP | EG | TEA | GLY | NMP | TDG | PHO | P12 | CAR | DEG |
|---|---|---|---|---|---|---|---|---|---|---|---|---|---|---|---|---|---|
| 1 | 5 | GL | 15 | ASC | 3 | 37 | 10 | 4 | | | | | | 1 | | | 30 |
| 2 | 3.5 | GL | 10 | ASC | 2.5 | 51 | | | 10 | 3 | 20 | | | | | | |
| 3 | 4 | SU | 8 | CA | 5 | 60 | | 5 | | | | | | | | | 18 |
| 4 | 6 | FR | 3 | CA | 8 | 70 | | | 4 | | 9 | | | | | | |
| 3 | 10 | GL | 12 | SA | 12 | 45 | | | 2 | | 9 | 9 | 1 | | | | |
| 2 | 3 | GL | 8 | ASC | 5 | 65 | 10 | 5 | | | 4 | | | | | | |
| 2 | 6 | FR | 2 | ASC | 12 | 45 | | 5 | | | | | | | | | 30 |
| 1 | 3 | GL | 10 | SA | 8 | 50 | | | | 1 | 15 | 10 | 3 | | | | |
| 5 | 3.5 | GL | 8.5 | SA | 3 | 63 | 12 | | | | 10 | | | | | | |
| 6 | 5 | GL | 15 | ASC | 3 | 37 | | 10 | | 4 | 30 | | | | | | |
| 7 | 10 | FR | 12 | SA | 12 | 45 | 2 | 9 | 9 | | | 1 | | | | | |
| 8 | 6 | GL | 2 | ASC | 12 | 45 | | 5 | | | 15 | | | | 2 | 13 | |
| 1 | 3 | GL | 10 | SA | 8 | 50 | | 5 | | 20 | 10 | | | | | | |
| 2 | 4 | GL | 8 | SA | 5 | 60 | | | 5 | 9 | 9 | | | | | | |
| 2 | 3.5 | SU | 8.5 | CA | 3 | 63 | 6 | 6 | | 5 | 5 | | | | | | |
| 6 | 4 | SU | 3 | ASC | 8 | 70 | 1 | | | 10 | | | 3 | | | | |
| 5 | 2 | GL | 6 | ASC | 10 | 50 | | | | | | | | | | 30 | 2 |
| 3 | 2 | GL | 4 | ASC | 5 | 41 | | | | | | | | | | 20 | 32 |

TABLE 6

| Dye | Dye content | Sugar | Sugar content | Acid | Acid Content | H$_2$O | PEG | SP | EG | TEA | GLY | NMP | TDG | PHO | P12 | CAR | DEG |
|---|---|---|---|---|---|---|---|---|---|---|---|---|---|---|---|---|---|
| 1 | 5 | GL | 15 | SS | 3 | 37 | 10 | 4 | | | | | | 1 | | | 30 |
| 2 | 3.5 | GL | 10 | PAA | 2.5 | 51 | | | 10 | 3 | 20 | | | | | | |
| 3 | 4 | SU | 8 | PA | 5 | 60 | | 5 | | | | | | | | | 18 |
| 4 | 6 | FR | 3 | TA | 8 | 70 | | | | 4 | | 9 | | | | | |
| 3 | 10 | GL | 12 | TA | 12 | 45 | | | | 2 | | 9 | 9 | 1 | | | |
| 2 | 3 | GL | 8 | AA | 5 | 65 | 10 | 5 | | | 4 | | | | | | |
| 2 | 6 | FR | 2 | MA | 12 | 45 | | 5 | | | | | | | | | 30 |
| 1 | 3 | GL | 10 | VA | 8 | 50 | | | | 1 | 15 | 10 | | 3 | | | |
| 5 | 3.5 | GL | 8.5 | SS | 3 | 63 | | 12 | | | | 10 | | | | | |
| 6 | 5 | GL | 15 | VA | 3 | 37 | | 10 | | 4 | 30 | | | | | | |
| 7 | 10 | FR | 12 | MA | 12 | 45 | 2 | 9 | 9 | | | | 1 | | | | |
| 8 | 6 | GL | 2 | MA | 12 | 45 | | | | 5 | | 15 | | | 2 | 13 | |
| 1 | 3 | GL | 10 | SS | 8 | 50 | | 5 | | | 20 | 10 | | | | | |
| 2 | 4 | GL | 8 | SS | 5 | 60 | | | | 5 | 9 | 9 | | | | | |
| 2 | 3.5 | SU | 8.5 | PAA | 3 | 63 | 6 | 6 | | 5 | 5 | | | | | | |
| 6 | 4 | SU | 3 | PA | 8 | 70 | 1 | | | 10 | | | | 3 | | | |
| 5 | 2 | GL | 6 | SS | 10 | 50 | | | | | | | | | | 30 | 2 |
| 3 | 2 | GL | 4 | VA | 5 | 41 | | | | | | | | | | 20 | 32 |

What is claim is:

1. An ink composition comprising:
   (a) from 0.1 to 50 parts of a dye;
   (b) from 0.1 to 50 parts of a sugar;
   (c) from 0.1 to 50 parts of a compound selected from the group consisting of phosphoric acid and a carboxylic acid or a salt thereof;
   (d) from 0 to 10 parts of a pH buffer; and
   (e) from 10 to 99 parts of a liquid medium;
   wherein all parts are by weight and the total number of parts (a)+(b)+(c)+(d)+(e)=100 said ink composition exhibiting superior light-fastness compared to such compositions that do not comprise both componenets (b) and (c).

2. An ink composition according to claim 1 wherein component (c) is an aliphatic or aromatic carboxylic acid.

3. An ink composition according to claim 1 wherein component (c) is an aliphatic carboxylic acid with from 2 to 10 carbon atoms and which is optionally substituted by one or more —OH group.

4. An ink composition according to claim 1 wherein component (c) is selected from ascorbic acid, succinic acid and citric acid.

5. An ink composition according to claim 1 wherein component (b) is a reducing sugar.

6. An ink composition according to claim 1 wherein component (b) is selected from the group consisting of glucose, fructose, α-cyclodextrin, β-cyclodextrin, γ-cyclodextrin, inusitol, mannitol and sorbitol.

7. An inks according to claim 1 wherein component (b) is selected from the group consisting of glucose, fructose, α-cyclodextrin, β-cyclodextrin, γ-cyclodextrin, inusitol, mannitol and sorbitol; and component (c) is an aliphatic carboxylic acid with from 2 to 10 carbon atoms and which is optionally substituted by one or more —OH group.

8. An ink composition according to claim 1 wherein component (b) is glucose and component (c) is ascorbic acid.

9. An ink composition according to claim 1 wherein the dye is a yellow, cyan, magenta or black dye.

10. An ink composition according to claim 1 wherein the dye is water-soluble.

11. A process for printing an image on a substrate comprising applying thereto an ink, characterised in that the ink is as defined in claim 1.

12. A paper, an overhead projector slide or a textile material printed with an ink as defined in claim 1.

13. An ink jet printer cartridge containing an ink as defined in claim 1.

* * * * *